US006209430B1

(12) United States Patent
Desmarais et al.

(10) Patent No.: US 6,209,430 B1
(45) Date of Patent: Apr. 3, 2001

(54) METHOD AND APPARATUS FOR PRODUCING A CONTINUOUS WEB FROM A BLOCK OF MATERIAL

(75) Inventors: Thomas A. Desmarais, Cincinnati; Thomas M. Shiveley, Moscow; David A. Sabatelli, Cleves, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/255,126

(22) Filed: Feb. 22, 1999

Related U.S. Application Data

(63) Continuation-in-part of application No. 08/939,172, filed on Sep. 29, 1997.

(51) Int. Cl.[7] .......... B23B 1/00

(52) U.S. Cl. .......... 82/47; 82/48; 82/101; 82/117

(58) Field of Search .......... 82/117, 118, 101, 82/93, 76, 73, 46, 47, 48

(56) References Cited

U.S. PATENT DOCUMENTS

| | | | | |
|---|---|---|---|---|
| 1,701,889 | * | 2/1929 | Junker | 82/117 |
| 2,827,413 | * | 3/1958 | Friedmann | 82/47 X |
| 3,537,342 | | 11/1970 | Peck et al. | 82/101 |
| 3,545,321 | * | 12/1970 | Phelps et al. | 82/47 |
| 4,107,827 | | 8/1978 | Sasshofer et al. | 28/246 |
| 4,274,315 | * | 6/1981 | Varner | 82/47 |
| 4,413,540 | | 11/1983 | Burge | 82/47 |
| 4,560,338 | | 12/1985 | Mioche | 425/308 |
| 4,916,989 | * | 4/1990 | Brown | 82/47 X |
| 4,934,224 | * | 6/1990 | Brown | 82/47 |

FOREIGN PATENT DOCUMENTS

| | | |
|---|---|---|
| 3717198 A1 | 12/1988 | (DE) . |
| 777 716 | 2/1935 | (FR) . |
| 1168367 | 10/1969 | (GB) . |
| WO 99/15448 | 4/1999 | (WO) . |

OTHER PUBLICATIONS

PCT International Search Report, date of mailing Jun. 7, 2000.

A conceptual sketch of Underwater Bun Cutting, which was included in a package of information received from Shell Chemical Co., Houston, Texas. The date on the package is Sep. 10, 1991.

* cited by examiner

*Primary Examiner*—Henry Tsai
(74) *Attorney, Agent, or Firm*—Michael S. Kolodesh; David M. Weirich; Ken K. Patel

(57) ABSTRACT

The present invention provides a method and an apparatus for forming a continuous web from a block of material. The block material has a base and a central axis extending generally orthogonally from the base. The apparatus preferably comprises a bath including a fluid into which the block of material can be at least partially submersed. Further, the apparatus preferably includes means for rotating the block about the central axis, a cutting device and means for linearly decreasing the predetermined distance of the cutting blade from the central axis. The cutting device is preferably positioned so as to make a cut into the block at a predetermined distance from the central axis, the cut being generally parallel to the central axis of the block. The material cut form the block preferably forms a continuous web.

7 Claims, 8 Drawing Sheets

METHOD AND APPARATUS FOR PRODUCING A CONTINUOUS WEB FROM A BLOCK OF MATERIAL

This application is a continuation-in-part of application Ser. No. 08/939,172, filed on Sep. 29, 1997, which is pending.

FIELD OF THE INVENTION

This invention pertains to the production of continuous sheets or webs of materials. In particular, this invention relates to the production of continuous sheets or webs from a monolithic block of foam, and more particularly, a microporous, open-celled polymeric foam.

BACKGROUND OF THE INVENTION

The development of sheets of microporous foams is the subject of substantial commercial interest. Such foams have found utility in various applications including thermal, acoustic, electrical and mechanical insulators, absorbent materials, filters, membranes, floor mats, toys, carriers for ink, dyes, lubricants and lotions. In the field of absorbent articles, such as disposable diapers, adult incontinence pads and briefs, and catamenial products such as sanitary napkins, the ability to provide higher performance is primarily contingent on the ability of the core to acquire, distribute, and store large quantities of discharged body fluids. Open-celled polymeric foams are one example of absorbent materials capable of acquiring, distributing, and storing large quantities of discharged body fluids. Absorbent articles containing such foams can possess desirable wet integrity, can provide suitable fit throughout the entire period the article is worn, and can minimize changes in shape during use (e.g., uncontrolled swelling, bunching). In addition, absorbent articles containing such foam structures can be easier to manufacture on a commercial scale. For example, absorbent diaper cores can simply be stamped out from continuous foam sheets and can be designed to have considerably greater integrity and uniformity than absorbent fibrous webs. Such foams can also be prepared in any desired shape, or even formed into single-piece diapers.

Particularly suitable absorbent foams for high performance absorbent articles such as diapers have been made from High Internal Phase Emulsions (hereafter referred to as "HIPE"). See, for example, U.S. Pat. No. 5,260,345 (DesMarais et al), issued Nov. 9, 1993 and U.S. Pat. No. 5,268,224 (DesMarais et al), issued Dec. 7, 1993, hereby incorporated herein by reference. These absorbent HIPE foams provide desirable fluid handling properties, including: (a) relatively good wicking and fluid distribution characteristics to transport the imbibed urine or other body fluid away from the initial impingement zone and into other regions of the foam structure to allow for subsequent gushes of fluid to be accommodated; and (b) a relatively high storage capacity with a relatively high fluid capacity under load, i.e. under compressive forces.

When formed into sheets or webs, these HIPE absorbent foams are also sufficiently flexible and soft so as to provide a high degree of comfort to the wearer of the absorbent article; some can be made relatively thin until subsequently wetted by the absorbed body fluid. See also U.S. Pat. No. 5,147,345 (Young et al), issued Sep. 15, 1992 and U.S. Pat. No. 5,318,554 (Young et al), issued Jun. 7, 1994, which discloses absorbent cores having a fluid acquisition/distribution component that can be a hydrophilic, flexible, open-celled foam such as a melamine-formaldehyde foam (e.g., BASOTECT made by BASF), and a fluid storage/redistribution component that is a HIPE-based absorbent foam.

For use in absorbent articles as part of an absorbent core, the block of water-filled foam is preferably formed into relatively thin sheets and dewatered. The polymerized HIPE foam is typically cut or sliced to provide a sheet thickness in the range from about 0.08 to about 2.5 cm. Often the polymerized HIPE foam is cut or sliced into sheet form prior to dewatering since sheets of polymerized HWE foam are generally easier to process during subsequent treating/washing and dewatering steps. It is also preferable that continuous webs of dewatered foam material be formed and be converted to roll stock, suitable for subsequent processing into absorbent cores in a continuous process.

Currently, HIPE foam production is batch processed by curing (polymerizing) a high internal phase emulsion in large tubs or vats. Once cured, the resulting block of material is a water-filled, open-celled foam. By water-filled is meant that the porous structure is substantially filled with the residual water phase material used to prepare the HIPE. This residual water phase material (generally an aqueous solution of electrolyte, residual emulsifier, and polymerization initiator) is typically about 90–99% by weight of the cured HIPE foam. The cured foam block is often substantially cylindrical in shape, the shape being determined by the shape of the tub or vat, which is essentially a mold. Until now, in a typical batch process, the cured, water-filled foam block was generally cylindrical in shape, approximately 40–60 inches in diameter, approximately 24 inches high, and weighed from 450–3000 pounds. The size and weight of the block, was generally limited by the post-formation processing techniques and the physical characteristics of the block material.

Due to the size, weight, and structural integrity of the water-filled, porous block after curing, forming continuous webs of uniform thickness is not economically practical or technically feasible by known methods such as veneering, or cutting by use of conventional saws. For example, the weight and structural integrity of the foam block requires it to be fully supported during any subsequent processing, including cutting or slicing continuous webs or sheets. If not fully supported, the block can collapse or deform causing the cutting, slicing or other processing to be uneven or ineffective.

Although commonly assigned U.S. patent application Ser. No. 08/939,172, entitled "Method And Apparatus For Producing A Continuous Web From A Block Of Material" filed Sep. 29, 1997 in the names of David Albert Sabatelli, et al. describes an apparatus and method suitable for slicing a cured foam block, such as a HIPE, the method is somewhat complex and does not specifically address the difficulties with handling very large blocks of foam or blocks of very soft materials, wherein simply supporting the block upon its base is insufficient to maintain the shape of the block.

Additionally, dewatering of the continuous web as well as other processing generally requires that the web be moving at a constant rate to provide reliable and repeatable results. Therefore, cutting or slicing the continuous web of water-filled HIPE foam from the perimeter of a cylindrical block is preferably accomplished as the block is rotating at a constant tangential velocity rather than a constant angular velocity.

Accordingly, it would be desirable to be able to form continuous webs of material from a monolithic block of material. Additionally, it would be desirable to be able to form continuous webs of material from a monolithic block supported in such a manner as to minimize deformation of the block prior to cutting or processing. Also, it would be desirable to be able to form a continuous web of water-fired HIPE foam material from a cured block of foam material. Further, it would be advantageous to be able to form continuous webs of foam material in an automated process such that webs of uniform thickness are produced at a uniform linear velocity. Even further, it would be desirable to increase efficiencies of scale by providing a method for cut very large blocks of material or blocks of soft material which could not have been effectively handled with prior art cutting and handling techniques.

SUMMARY OF THE INVENTION

The present invention provides an apparatus for forming a continuous web from a block of material. The block material has a base and a central axis extending generally orthogonally from the base. The apparatus preferably comprises a bath including a fluid into which the block of material can be at least partially submersed. Further, the apparatus preferably includes means for rotating the block about the central axis, a cutting device and means for linearly decreasing the predetermined distance of the cutting blade from the central axis. The cutting device is preferably positioned so as to make a cut into the block at a predetermined distance from the central axis, the cut being generally parallel to the central axis of the block. The material cut form the block preferably forms a continuous web.

The present invention also provides a method for forming a continuous web of material from a block of material. Specifically, the method includes the steps of providing the block of material; submersing a substantial portion of the block in a fluid; providing a cutting device positioned a predetermined distance from the central axis of the block of material, the cutting mechanism being disposed generally parallel to the central axis; rotating the block of material about the central axis; and linearly decreasing the predetermined distance between the cutting device and the block of material while rotating the block of material such that the continuous web is produced as the cutting device cuts in a substantially spiral path through the cylindrical block.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and when:

DETAILED DESCRIPTION OF THE INVENTION

Figure 1:
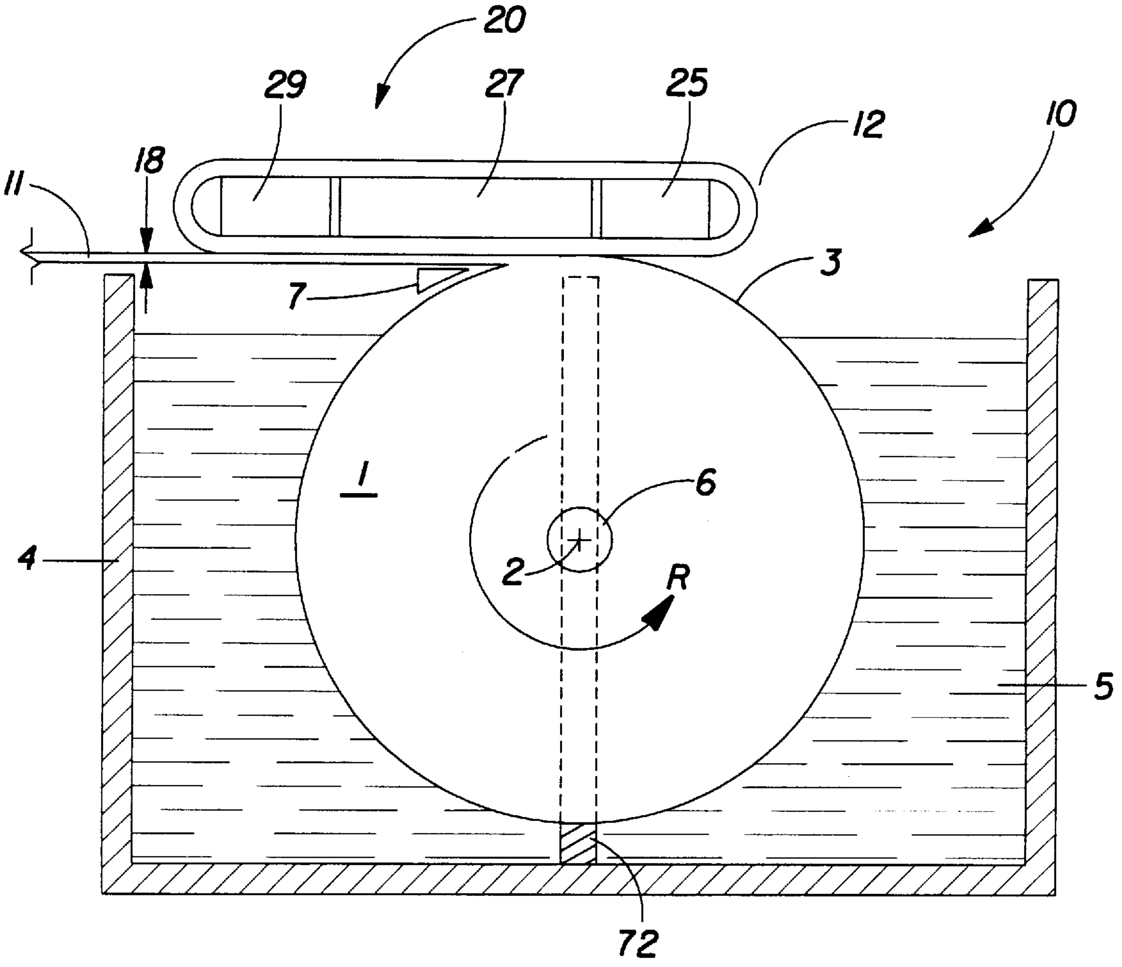
FIG. 1 is a cut-away side view on one embodiment of the present invention.

While the following disclosure describes the method and apparatus of the present invention primarily in relation to the cutting of webs of polymeric foam materials, it is to be understood that the neither the method nor the apparatus of the present invention is limited to the processing of such materials. The method and apparatus of the present invention may be useful for the processing of any material that may be blade cut and which has sufficient structural integrity to be processed as a web or sheet, such as non-foamed polymers, wood, or cheese, or especially other structures that hold or are saturated with fluids such as water or gelatinous materials.

As used herein, the term "block" refers to the material to be cut, prior to being cut. In general, in the context of the present invention, the term "block" refers to any three-dimensional, monolithic material suitable for cutting or slicing by a blade. The block need not be any particular shape to begin with, but it will be understood from the description that follows that a block having a cylindrical cross section is generally preferred. A block in the shape of a right circular cylinder is preferred so as to minimize scrap and maximize the length of the cut web. In the context of the preferred embodiment of the present invention, as described below, the term "block" is used to refer to the solid foam HIPE structure formed as a result of curing a high internal phase emulsion in a batch process, sometimes referred to as a "bun". Such blocks may be made according to the processes taught in commonly-assigned U.S. Pat. Nos. 5,149,720; 5,198,472; 5,250,576; 5,650,222 and 5,827,909; the disclosures of which are hereby incorporated herein by reference.

As noted above, when cutting continuous webs having uniform thickness by the method of the present invention, a block in the form of a cylinder of generally circular cross section is generally preferred. The starting block, however, may be non-circular in cross-section, with the initial "rounding off" of the block producing non-continuous portions of material, possibly scrap to be recycled or discarded. The aforementioned U.S. Pat. No. 5,650,222 describes a method of making foam blocks in generally circular molds, which result in blocks that are generally cylindrical.

When cutting a block of HIPE foam, the method of the present invention produces a substantially continuous web of polymeric foam material from a water-filled block of cured foam. By "water-filled" is meant that the porous structure is substantially filled with the residual water phase material used to prepare the HIPE. This residual water phase material (generally an aqueous solution of electrolyte, residual emulsifier, and polymerization initiator) is typically about 90–99% by weight of the cured HIPE foam.

The continuous web may be dewatered and wound as roll stock or otherwise processed after being cut from the block of cured foam. Dewatering the foam block prior to cutting into webs or sheets could make the block easier to handle, but block dewatering is very time consuming and impracticable on a commercial scale. Therefore, continuous webs or sheets are preferably cut from the water-filled block of polymer foam and further processed to remove residual water. These polymer foam webs or sheets may then be subjected to subsequent processing, treating, or forming, to provide an end product or an element of an end product, such as an absorbent core for an absorbent article. In a preferred embodiment the web is processed and rolled into roll stock at a substantially constant linear speed, with any further processing, such as dewatering, occurring between the time the web is cut and when the web is wound as roll stock.

If block 1 includes a HIPE foam, it is preferably cut shortly after curing, while the block is still at or near the cure temperature. (In some embodiments, however, it may be preferred to cut the block at temperatures well below the curing temperature.) Suitable curing temperatures will vary depending upon the monomer and other makeup of the oil and water phases of the emulsion (especially the emulsifier systems used), and the type and amounts of polymerization initiators used. Frequently, however, suitable curing conditions will involve maintaining the HIPE at elevated temperatures above about 122° F. (50° C.), more preferably above about 150° F. (65° C.), and most preferably above about 175° F. (80° C.), for a time period ranging from about 2 to about 64 hours, more preferably from about 2 to about 48 hours.

As noted above, a typical HIPE foam is still water-filled after curing. Being water-filled makes the block of HIPE foam relatively heavy, with a density near that of water. However, the typical block of HIPE has very little structural material strength. The weight and structural integrity of the water-filled block necessitates adequate support during the cutting operation in order to ensure that the cutting operation provides suitable thin sheets of substantially uniform thickness. Thus, for water-filled HIPE foams, especially blocks having one dimension greater than about 2 feet; or blocks of foam which are very soft, (e.g. those described in U.S. Pat. applications Ser No. 09/042,418 and 60/077,955, which are incorporated by reference herein), it has been found that at least partially submerging the block in a supporting liquid is advantageous.

FIG. 1 shows a cut-away side view of an embodiment of an apparatus of the present invention 10, and a block 1 of material (e.g., a block of cured HIPE foam material) being cut into a web of uniform thickness by the method of the present invention. As shown in FIG. 1, block 1 is preferably in the shape of a right circular cylinder with a central axis 2, and a perimeter face 3. When block I is oriented such that central axis 2 is generally horizontal, as shown in FIG. 1, perimeter face 3 is defined by the generally horizontal side of cylinder-shaped block 1. It should be noted however, that the central axis 2 may be oriented in any direction within the block 1.

Figure 2:
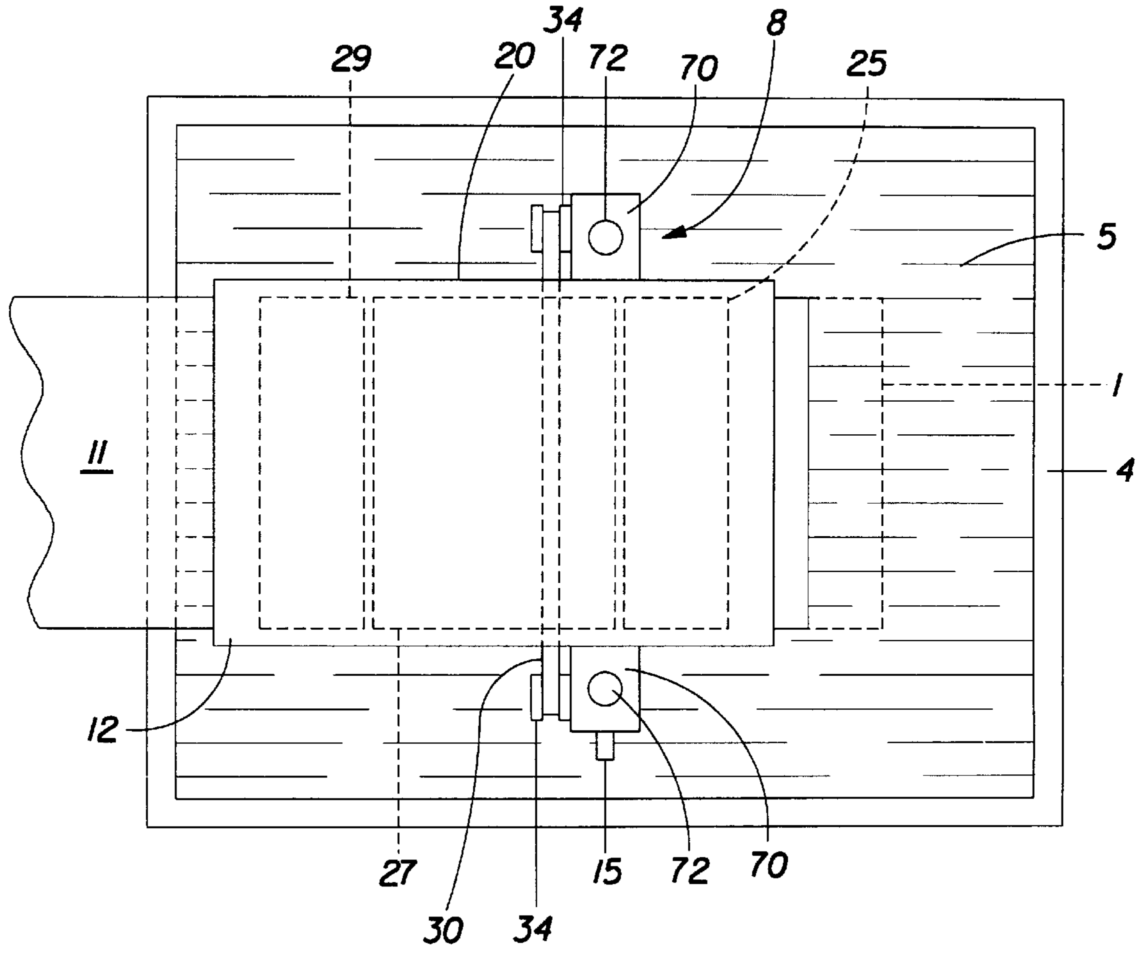
FIG. 2 is a top view of one embodiment of the apparatus shown in FIG. 1.

As shown in FIGS. 1 and 2, block 1 is preferably at least partially submerged in fluid 5 which is located in the bath 4. Since the block 1 is at least partially submerged in the fluid 5, the stress of gravity on the solid material comprising the block 1 is greatly reduced from that which would be present if the block were surrounded by air. This reduces the deformation of the block 1 prior to rotation and cutting. Additionally, the stress on the material comprised in the block 1 when rotated at desirable speeds for efficient cutting and subsequent processing steps is nearly eliminated. Only inertial forces during acceleration and deceleration of the block 1 and minor centrifugal forces remain. These acceleration and deceleration forces can be managed by increasing the rotation speed of the block I slowly.

In preferred embodiments, the block 1 should be submerged enough to substantially eliminate the deformation of the block 1. Preferably, the block is submerged to eliminate deformation at high rotation speeds. In preferred embodiments, the block 1 should be at least about 75% submerged, preferably about 85% submerged and more preferably about 95% submerged to effectively eliminate damaging centrifugal stresses due to the fluid remaining in the block 1.

The fluid 5 in the bath 4 can comprise any fluid that will support at least a portion of the block 1 when the block 1 is submerged in the fluid 5. Although the fluid 5 may have any suitable density, it has been found that the density of the fluid 5 relative to the block 1 be between about 0.8 to about 1.5, preferably from about 0.9 to about 1.3, most preferably from about 0.9 to about 1.2. In one preferred embodiment, the fluid 5 is the same or of similar composition to the fluid left in block 1 between the time the block 1 is formed and when the block 1 is dewatered. This ensure the fluid 5 will have a proper density to effectively reduce the gravitational and centrifugal forces on the block 1 during the cutting process. Conveniently, in many cases, the fluid 5 may be aqueous in nature which helps reduce the cost of the system. Further, to avoid environmental concerns, low toxicity inorganic salts and water are often preferred. In most cases, it is preferred that the fluid 5 not negatively affect the material of the block 1, however, it is contemplated that interaction between the fluid in the block 1 and the fluid 5 in the bath 4 may be desirable in some circumstances. For example, such intervention may provide a coating on the web 11 or may otherwise alter the physical or chemical characteristics of any portion of the web 11.

As may be understood from FIGS. 1 and 2, in operation block 1 is preferably rotated about central axis 2 while simultaneously moving linearly toward the blade mechanism 7 such that block 1 is fed into blade mechanism 7 as it rotates. Block 1 is rotatable about the central axis 2 and may be driven for rotation by center hub 6, as shown in FIG. 1. The center hub 6 may be rotated by any means known in the art for rotating shafts, including chains, belts, gears and the like. Alternatively, block 1 may be rotated by any other known rotation means. For example, the block 1 may be rotated by air or liquid jets located in or out of the bath 4. Further, the block 1 may be rotated by belts, drums, gears or the like which contact a portion of the surface of the block 1. Yet other means for rotating the drum include electrical currents, bubbles, manual rotation.

Figure 3:
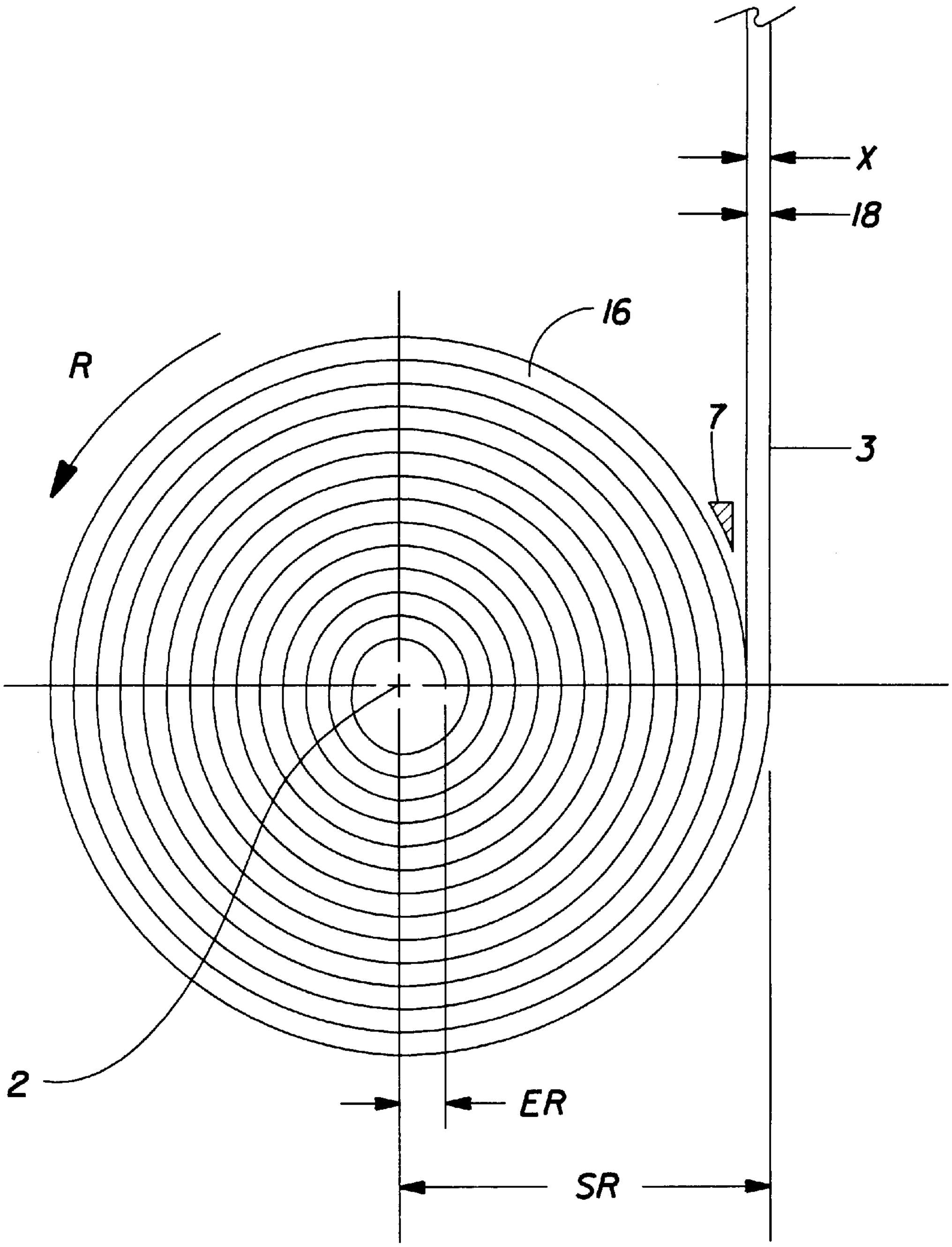
FIG. 3 is a schematic representation of the spiral cut path of the apparatus of the present invention.

For each rotation of block. 1, linear drive mechanism 8 (one example of which is shown in FIG. 2) preferably linearly advances center hub 6 and central axis 2 a distance predetermined by the operator as the desired web thickness 18. Web thickness 18 is controlled by the relationship of the center hub rotation and the center hub translation. Thickness 18 is defined as the thickness of material between perimeter face 3, when tangent to the blade mechanism 7, and blade mechanism 7, as shown in FIG. 3. As shown in FIG. 1, as perimeter face 3 is being removed by cutting, a new perimeter face is continuously exposed. Also, perimeter face 3 becomes continuously closer to central axis 2 as the block 1 is cut. Accordingly, to maintain a constant web thickness 18, block 1 is preferably linearly advanced continuously as it rotates.

The linear drive mechanism 8 may be any drive mechanism which is capable of moving the block 1 toward the blade 30 at the desired rate. Examples of suitable drive mechanisms include, but are not limited to hydraulics, screws, levers and linkages. One preferred embodiment includes a standard four bar linkage designed to move the block 1 toward the blade 30 at the desired rate. However, alternative means are also contemplated including pumping air or other fluids into the hub 6 to increase the buoyancy of the block 1 in the fluid 5. Further, the temperature or the chemical concentration of the fluid can be altered to change the density of the fluid 5 and thus, the buoyancy of the block 1 in the fluid 5.

In a preferred embodiment of the present invention, a central controller 15 is implemented to coordinate the block's movements with the cutting device. An important parameter to control is the relative relationship between central axis 2 of the block 1 (and thereby perimeter face 3) and the cutting device 7. The central controller 15 may be any mechanical, chemical or electrical controller known in the art. In one preferred embodiment, the controller is programmable, such that an operator may simply choose a predetermined desired web thickness and operating speed and the central controller 15 dictates all other processing parameters.

As shown schematically in FIG. 3, the path of the cutting device 7 as it cuts the web 11 is essentially a spiral, beginning at the outside of the block 1 and progressing inwardly. A constant tangential velocity in the outgoing (cut) web 11 is maintained by cutting along the spiral path 16 at a constant linear velocity. Constant velocity along the spiral path 16 is preferably accomplished by position loops simultaneously controlling two axes of motion, i.e., the rotational and linear motion of center hub 6. The distance between the cutting device 7 and the center of rotation of the block 1 is controlled by the linear axis, while the rotational axis controls tangential motion, including the tangential velocity of the periphery of the block being cut. Control is preferably accomplished by first moving the center hub 6 from a beginning distance between the center of rotation and the blade to the start radius SR. The start radius SR, shown in FIG. 3, is the maximum radius for a given cylindrical block. For a non-round block, the start radius would be the maximum distance between the central axis 2 and an outside edge or corner of the block. As noted above, however, continuous webs will not be produced until the block is "rounded off", thereby being generally circular in cross section.

The spiral path 16 continues from the start radius SR to the end radius ER. The end radius ER is typically as near the center hub 6 as is practicable to minimize waste. The rotational axis and the linear positions are controlled such that block 1 is moved a "target" distance along the spiral path at a constant velocity. The "target" distance is a calculated distance along the spiral path 16 that must be traversed in a given time interval in order for the tangential web velocity to remain constant throughout the cutting operation. In a preferred embodiment, the position targets are updated continuously on a fixed time interval of about 2 msec.

In a preferred embodiment, the target distance, TD, which is the distance to move along the spiral path 16 within the fixed time increment, is defined by the equation:

$$TD(in)=(\text{web line speed}(ft/min)*12(in/ft)60\ sec/min))*\text{time interval}(sec.)$$

The total target distance TD traversed along the spiral path is computed as an accumulated running total, ATD, and used in the following equations to determine the target positions of the rotating central axis 2 (angular axis), θ (radians), and the radius (linear axis), r (in), to the cutting device:

$$r=\text{sqrt}(SR(in)2-A(in)*ATD(in))$$

$$\theta=SR(in)-r(in)/B(in)$$

where sqrt denotes a square root sign, SR(in)2 denotes the start radius SR measured in inches taken to a second power, and the constants A and B are determined by the cut thickness (x) desired and are calculated by the equations:

$$A=x(in)/\pi$$

$$B=x(in)/2\pi$$

Therefore, as can be seen from the above equations, the controller 15 takes the web line speed and cut thickness as inputs from an operator, and then uses position loops to control two axes of motion to ensure a constant tangent velocity along the spiral path 16, and consequently a constant linear velocity in the cut web as it is conveyed away for further processing.

The speed of both the rotational axis and the axis controlling the cut radius (linear advancement of the central axs 2 toward the cutting mechanism) are constantly changing with time to ensure that the linear velocity of the cut web is maintained at the predetermined line speed. The change is due to the geometry of the spiral cut and requires that both angular velocity and linear advancement both increase non-linearly with decreasing block radius. Therefore, the rate of angular rotation and the rate of linear advancement are not linear as a function of cut distance, but both actually increase with cut distance such that the tangential velocity remains constant.

Once cutting is initiated, and any necessary rounding off of block 1 is accomplished, cutting device 7 remains generally parallel to perimeter face 3 during web production. That is, the cutting device 7 is oriented generally horizontally and substantially parallel to central axis 2. While many different blade configurations may work, including toothed and un-toothed reciprocating blades, the blade in cutting device 7 is preferably a toothless continuous band. In one preferred embodiment, cutting blade mechanism 7 is a bandsaw style cutting unit similar to model 50-88 Horizontal Slitter manufactured by ESCO EDGE-SWEETS Co. 2887 Three Mile Rd. N.W., Grand Rapids, Mich., 49504-1366, USA.

Figure 4:
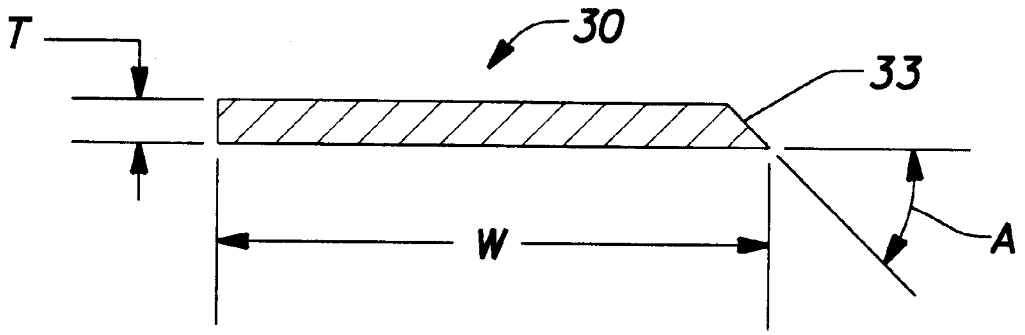
FIG. 4 is a cross-sectional view of a blade element of the present invention.

Although any suitable blade or other cutting means may be used, it is important to note that the design of the blade may also affect the life of the blade. For cutting HIPE foam blocks with either a reciprocating "saber" saw blade, or a continuous blade embodiment, a stainless steel knife-edge blade 30 (i.e., a blade having no teeth) is generally preferred over a toothed blade. As shown in FIG. 4, blade 30 for use with a continuous band saw configuration may have a blade width, W, of about one inch, a blade thickness, T, of approximately 0.005 inches, and a single-bevel leading edge 33, cut at an angle, A, of 15° to 45°. A suitable blade for use with a reciprocating saw configuration may have similar dimensions, but with a thickness of about 0.027 inches.

Figure 5:
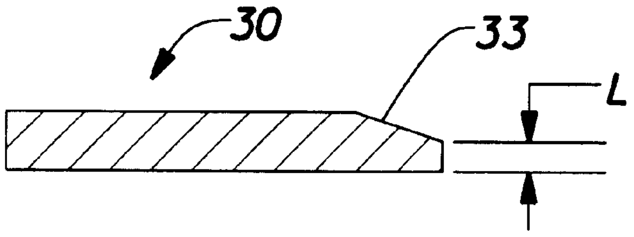
FIG. 5 is a cross-sectional view of an alternative embodiment of a blade of the present invention.
Figure 6:
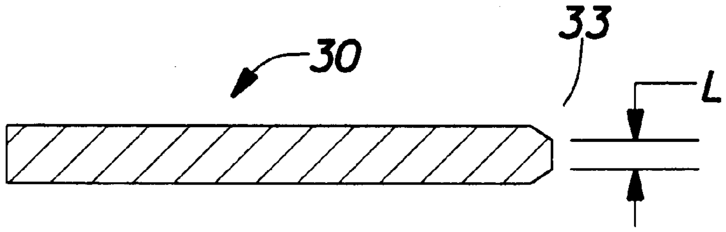
FIG. 6 is a cross-sectional view of a further alternative embodiment of a blade of the present invention.

Blade life may also be increased by cutting the leading edge 33 of the blade with a blunted angle as shown in FIGS. 5 or 6. In the configurations of FIGS. 5 and 6, the leading edge 33 of the blade 30 is blunted to form a land area L. Blades with a land area L often perform longer, producing a higher quality cut, than blades with no land area, as shown in FIG. 4. Without wishing to be bound by theory, it is believed that blades with land area L perform longer due to corrosive and wear effects on the leading edge 33. A sharpened leading edge 33, as shown in FIG. 4, tends to corrode and wear in a non-uniform manner producing a "jagged" edge that does not produce an acceptably high quality cut in the finished web.

To aid in producing webs having uniform thickness, a blade guide 67 may be used to guide and stiffen blade 30. Blade guide 67 is designed to aid in tracking the blade, such that the cut web thickness 18 is constant across the width of the web. Blade guide 67 should have adequate stiffness and fit closely enough about the blade 30 so as to enable the blade 30 to withstand the lateral and edge-on forces of the block 1 as it is being fed into the blade 30, and keep the blade 30 from deflecting, "drifting", or "wandering" off of the cut path. However, care must be taken to ensure that the blade guide 67 does not crimp or bind up the blade 30, thereby hindering or preventing the blade 30 from functioning in its intended motion.

Figure 7:
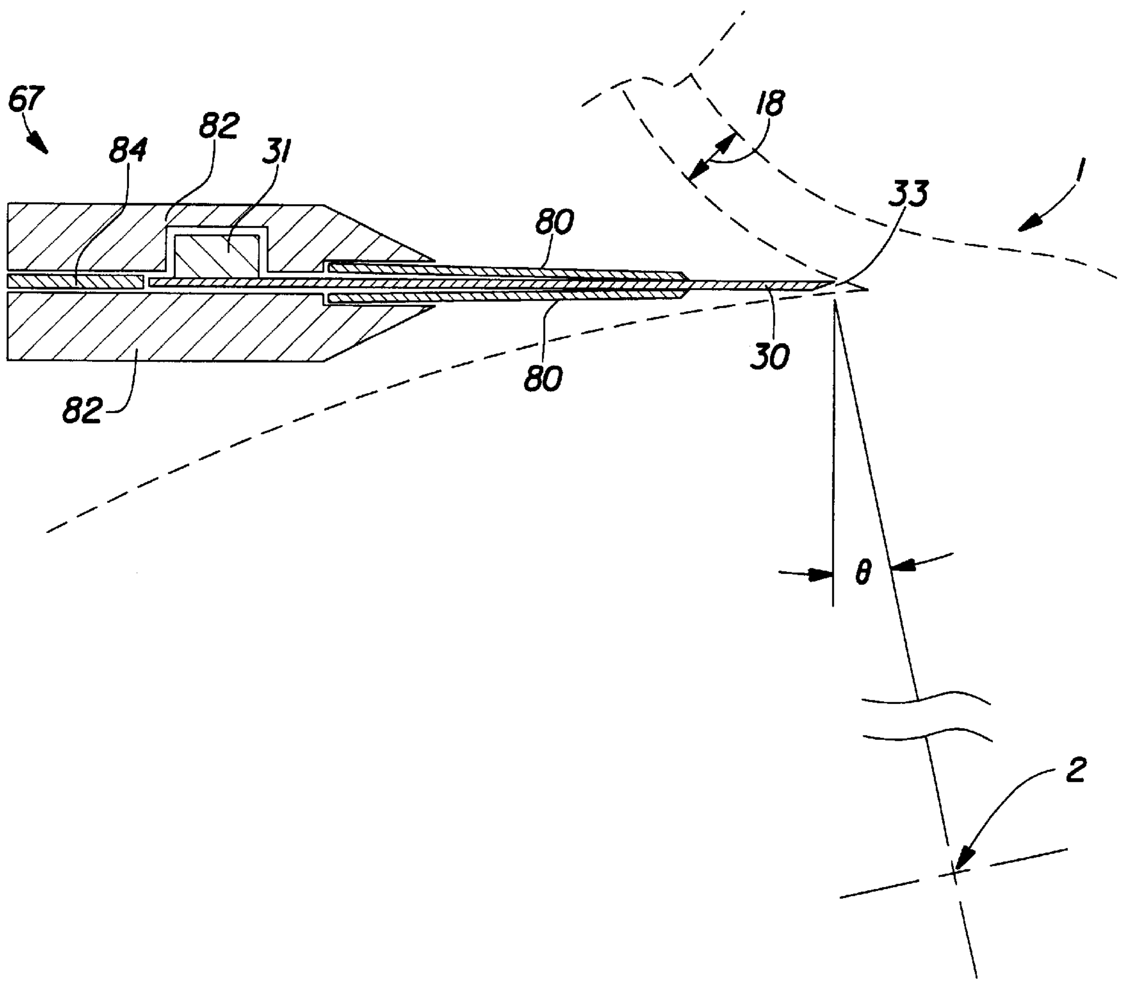
FIG. 7 is a cross-sectional view of a blade and blade guide assembly of the present invention.

A preferred blade guide 67 for a continuous band saw configuration is shown in FIG. 7, which shows a blade guide 67 and blade 30 in cross section. In the embodiment shown, blade guide 67 includes two guide members 80 made of thin, relatively stiff sheet material, for example, tempered spring steel. The guide members 80 are preferably stainless steel thin enough so as not to interfere with the web 11 as it is cut by the leading edge 33 of blade 30. A suitable thickness for guide members 80 is 0.025–0.030 inches, with a preferred thickness of about 0.027 inches. Guide members 80 are attached by connection means (not shown) to guide member supports 82, which are attached to, and spaced apart by, blade guide spacer 84. Riveting with countersunk and ground rivets is one suitable method of connecting guide members 80 to guide member supports 82. One or both of guide member supports 82 may be grooved to provide a space for flexible bead 31 to track, described below with reference to FIGS. 10–12.

Figure 8:
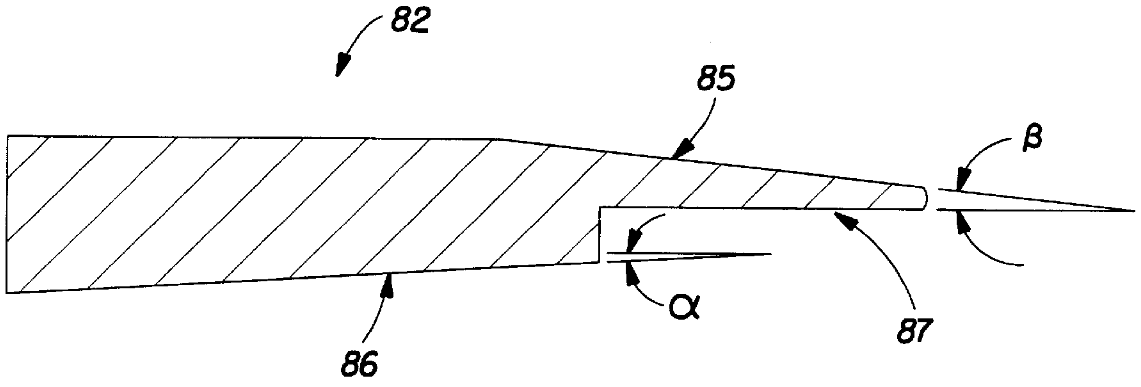
FIG. 8 is a cross-sectional view of an element of a blade guide of the present invention.

Guide members 80 are preferably mounted at a slight angle in relation to blade 30 such that they make minimal contact with blade 30. The minimal contact preferably occurs as near leading edge 33 of the blade 30 as practicable. A preferred method for accomplishing minimal contact with blade 30 is to mount guide members 80 to specially made guide member supports 82 as shown in FIG. 8. As shown in FIG. 8, blade-facing surface 86 is not parallel with guide member mounting surface 87, but is actually formed at an angle $\alpha$. In operation blade-facing surface 86 is generally parallel to blade 30 so that mounting surface 87, and therefore mounted guide members 80 make an acute angle with blade 30. It has been found that an angle $\alpha$ of about 1° is generally preferred to assure that guide members 80 approach blade 30 at an angle, nearly touching near leading edge 33. Additionally, to assure that the cut web does not interfere with the blade guide 67, guide member support 86 is preferably formed with a leading taper. For example, in FIG. 8, surface 85 is formed at an angle $\beta$ to surface 87. It has been found that an angle $\beta$ of about 5° is preferred to assure that blade guide 67 does not interfere with the cut web as it is removed from the block.

In addition to the overall profile of the blade guide 67 should be designed so as to minimize the effective increase in blade/blade guide width and thickness. In particular, minimizing the blade guide thickness aids in cutting by allowing the block 1 and the blade 30 to operate in relation to one another at nearly right angles. For example, in FIG. 7 block 1 is represented as a broken line. Because of the design of blade guide 67, block 1 is not advanced linearly at a right angle to blade 30. Instead, block 1 is advanced at some angle $\theta$ that allows the curvature of the block to clear the blade guide 67. It has been found that for a cylindrical block diameter of up to approximately 54 inches, the radius of curvature of the circumference of the block requires that the angle $\theta$ of linear advancement into blade 30 be approximately 6°, as depicted schematically in FIG. 7. As the web 11 is cut, and the block diameter decreases, this angle may be decreased, but it is not necessary to do so. Greater or lesser angles may be used as necessary, depending on the blade guide configuration, the blade width and thickness, and the overall diameter of the starting block.

Figure 9:
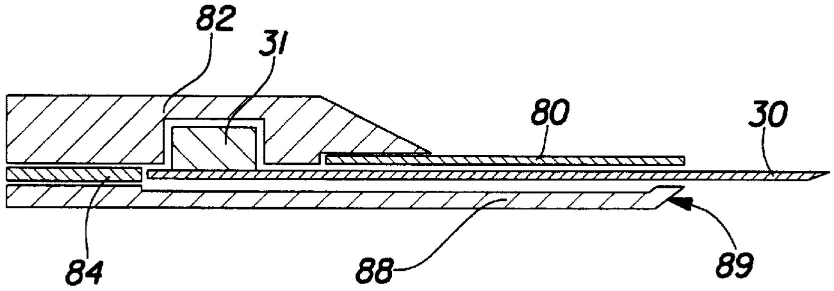
FIG. 9 is a cross-sectional view of an alternative blade and blade guide assembly of the present invention.

One preferred blade guide variation for use with a continuous blade to minimize possible interference of blade guide 67 with block 1 during cutting is shown in cross section in FIG. 9. The blade guide configuration shown in FIG. 9 minimizes the thickness of the blade guide 67 on the block side of the blade by use of a low profile blade guide 88. Low profile guide 88 replaces both the guide member and guide member support on the block side of the guide. As shown in FIG. 9, low profile guide member 88 is preferably formed with a lip 89 so as to minimize contact with blade 30. Low profile guide member 88 is preferably made of similar material to guide member support 82, such as stainless steel.

To further aid in blade guiding and tracking in continuous blade configurations, various blade design modifications may be made. One option, shown in FIGS. 7 and 9 with reference to the preferred blade guides, is to mold a flexible bead 31 of suitable polymeric material to the blade 30. The polymeric material chosen should have sufficient flexibility and durability so as to last as long as the blade 30. A preferred polymer for this purpose is polyurethane, preferably with 30–60 Shore A durometer. Blade 30 is kept from "walking" off of the pulleys 34, or otherwise drifting on the pulleys 34 by firmly seating flexible bead 31 into grooves on each pulley 34.

Figure 10:
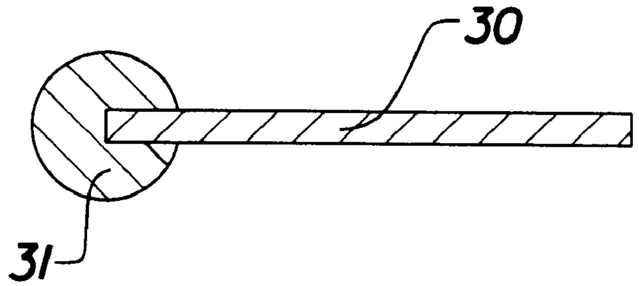
FIG. 10 is a cross-sectional view of a blade design incorporating a bead attached to the trailing edge.
Figure 11:
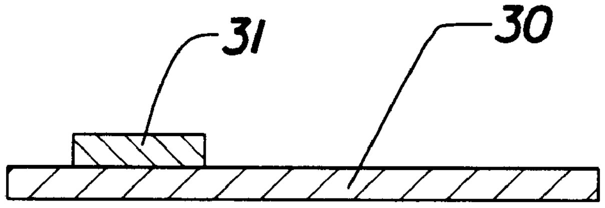
FIG. 11 is a cross-sectional view of a blade design incorporating a bead attached to one side of the blade.
Figure 12:
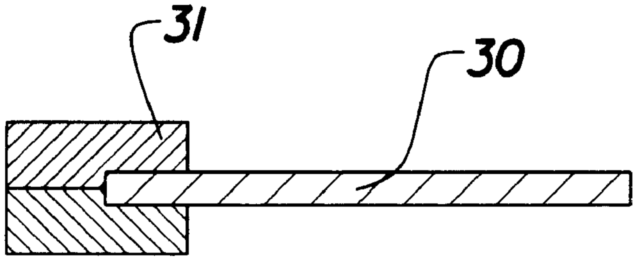
FIG. 12 is a cross-sectional view of a blade design incorporating another embodiment of a bead attached to the trailing edge of the blade.

The flexible bead 31 may be formed in many different shapes and configurations, and those shown in FIGS. 10–12 are meant to be illustrative but not limiting. The bead may be molded and/or adhered to the blade in any manner known in the art for forming or adhering polymers on metal. In one embodiment, a bead as shown in FIG. 10 may be molded onto the trailing edge of blade 30. In such a configuration, bead 31 preferably has a bead diameter of about 0.060–0.090 inches designed to run in corresponding grooves in the pulleys. In a more preferred embodiment, as shown in FIG. 11, flexible bead 31 is essentially a polymer belt bonded to the pulley-side of blade 30, that likewise runs in corresponding grooves in the pulleys. In the general configuration shown in FIG. 11 the bead preferably has a total thickness (elevation off the blade) of about 0.030 inches. In still another alternative, two belts of polymeric material could be affixed together on the trailing edge of blade 30, as shown in FIG. 12. In all cases, corresponding grooves in pulleys 34 and blade guides 67 would assure proper tracking of the blade 30.

Figure 13:
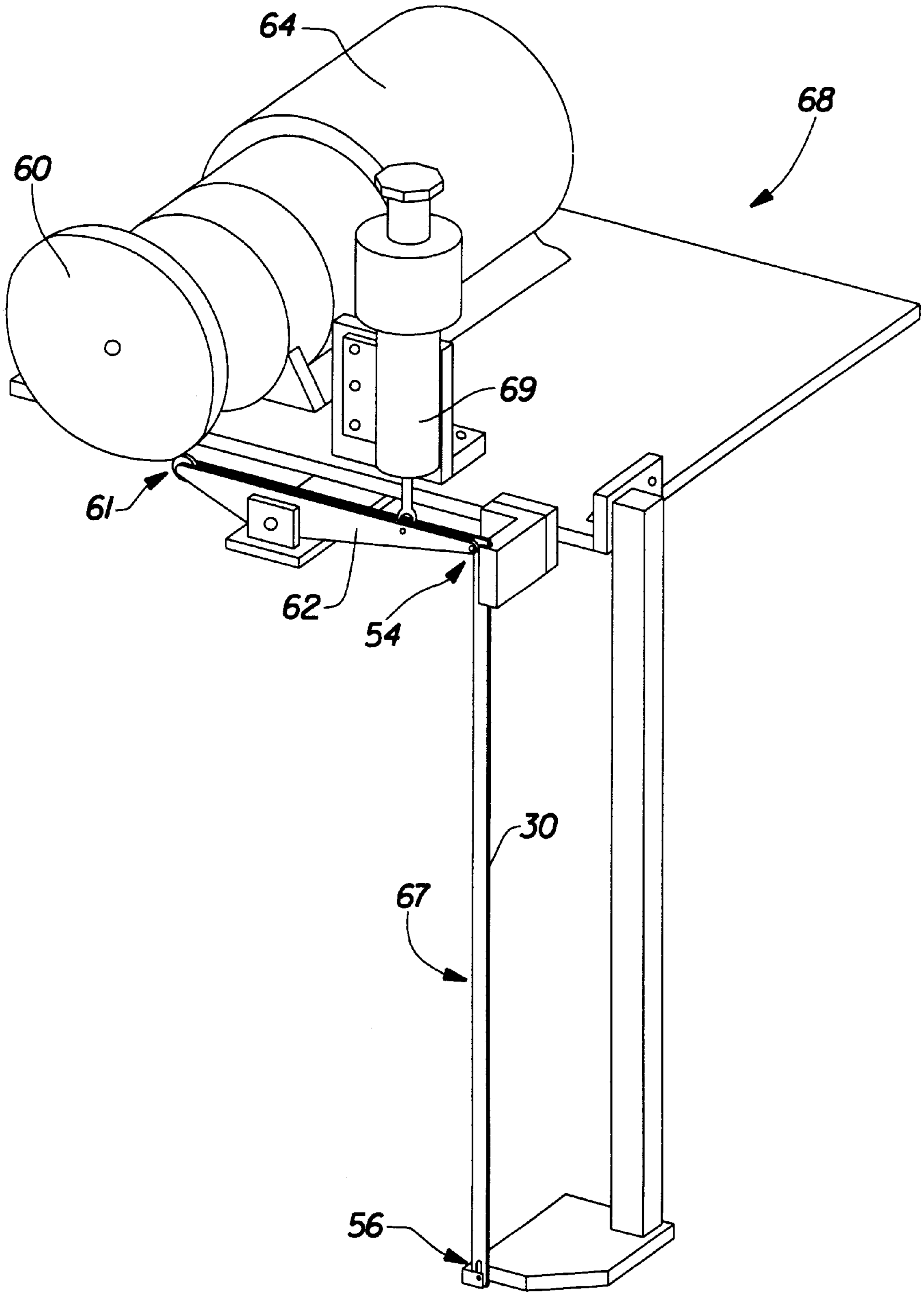
FIG. 13 is a perspective view of a reciprocating saw embodiment of the present invention.

An alternative embodiment of the present invention comprises a reciprocating saw arrangement 68, the major components of which are depicted in FIG. 13. As shown, a suitable reciprocating saw arrangement 68 preferably comprises a motor 64 that drives a cam 60. The motor 64 may be linked to a suitable gear box to provide the desired cam RPM output. In a preferred embodiment motor 64 and associated gearing allows for variable RPM outputs. Cam 60 in turn drives a cam follower 61 that actuates lever arm 62, which is mechanically linked to produce the reciprocating motion of blade 30. In a preferred embodiment a springloaded bias is applied to lever arm 62 to ensure proper continuous rolling contact of cam follower 61 upon cam 60. Adjusting screw 63 may be included to adjust the necessary spring force upon lever arm 62, depending upon the RPM of the motor and cam.

In the reciprocating saw arrangement shown in FIG. 13, blade 30 is held by a pin and hole, or pin and slot arrangement for the upper securement 54. Blade 30 is slotted at its lower end to form a pin and slot lower securement 56. Blade guide 67 may be used to stiffen and help guide blade 30, the blade guide supported similarly at the upper and lower securements. However, the increased thickness of a preferred reciprocating blade decreases the need for a relatively complex blade guide as described above. Suitable designs for a reciprocating blade guide include standard guides such as those manufactured by Bosch, Inc., for their line of commercially available reciprocating saws.

After the web 11 is cut from the block 1, it may be drawn away for further processing by a vacuum take away unit 20, as shown in FIGS. 1 and 2. A preferred vacuum take away unit 20 comprises an air permeable endless belt 12, that wraps around a vacuum box and is driven such that the linear velocity of the belt 12 is constant and substantially equal to the tangential velocity of the perimeter face of the block, and thereby substantially equal to the linear velocity to the web once cut. The vacuum causes suction that draws the web 11 sufficiently tightly against endless belt 12 such that belt 12 is essentially a conveyor carrying the web 11 off of the block 1 as it is formed.

Vacuum take away unit 20 may comprise any number of sections and each section may have independently adjustable vacuum levels. After being cut by the blade 30, the web 11 is drawn away from the blade 30 by a first vacuum section 25, as shown in FIG. 2. First vacuum section 25 has a level of vacuum sufficient to draw the web away from the blade 30 without causing undue crimping, bending, or tearing of the web 11 as it is cut. Ideally, the proximity of vacuum take away unit 20 and vacuum level of first vacuum section 25 allows the system to be "self threading". In other words, once blade 30 begins cutting a continuous web, the leading edge is attracted to and positively controlled by first vacuum section 25, then the web 11 is conveyed on for further processing in a continuous fashion. Second vacuum section 27 has a level of vacuum sufficient to pull the web linearly at a velocity substantially equal to the tangential rotational velocity of the rotating block. Section 27 is primarily a conveying section, that is, its primary purpose is to pull the web 11 in the web direction at a constant velocity.

The web that is cut from a water-filled HIPE foam block is itself water-filled, so vacuum section 29 should have sufficient vacuum to dewater the web to a certain degree, preferably at least about 50%. Vacuum section 29 has a primary purpose of removing a substantial amount of water and is the first in a series of dewatering steps used in a preferred web forming apparatus. If desired or necessary, further dewatering and washing/dewatering steps may be utilized as well as various drying methods known in the art, such as radiant heat drying to produce a web having desired physical properties. Further, the web 11 may then be conveyed for further processing such as rolling on to rolls as rollstock, or compressing the web to a different thickness. It is appreciated that other devices to remove the web or process the web could be implemented and still fall within the scope of the invention.

While particular embodiments of the present invention have been illustrated and described, it would be obvious to those skilled in the art that various other changes and modification can be made without departing from the spirit and scope of the present invention. The foregoing is therefore intended to cover in the appended claims all such changes and modifications that are within the scope of the present invention.

What is claimed is:

1. A method for forming a continuous web of material from a block of material having a central axis and a first density, the method comprising the steps of:

(a) providing the block of material;

(b) submersing a substantial portion of the block in a liquid disposed in a bath and having a second density, wherein at least a portion of the block is disposed above the liquid in the bath;

(c) providing a cutting device having a cutting blade which is positioned a predetermined distance from the central axis of the block of material and disposed generally parallel to the central axis;

(d) rotating the block of material about the central axis;

(e) linearly advancing the central axis of the block of material a predetermined distance toward the cutting device while rotating the block of material such that the continuous web is produced as the cutting device cuts in a substantially spiral path through the block of material; and (f) controlling the predetermined distance between the cutting device and the central axis such that the continuous web cut from the block of material is of substantially uniform thickness.

2. The method of claim 1 wherein the step of linearly advancing the central axis of the block of material a predetermined distance toward the cutting device is performed by changing the second density of the fluid in which the block of material is submerged.

3. The method of claim 1 wherein the step of controlling the predetermined distance between the cutting device and the central axis includes defining a starting position and a time-dependent target distance along the spiral path which determines a target position for the central axis with respect to the cutting device, and wherein the target position includes both an angular axis and a linear axis.

4. The method of claim 1 wherein the step of providing the block of material further comprises the step of selecting a material selected from the group consisting of: an open-celled foam, a HIPE foam and a water-filled foam.

5. The method of claim 1 wherein step (b) includes submerging of the block in the liquid at least about 75%, at least about 85% submerge, and at least about 95%.

6. The method of claim 1 further including the step of providing a vacuum take away device superimposed onto the portion of the block which is disposed above the liquid in the bath such that, when the web is once cut, the web is capable of self threading into the vacuum take away device to be carried away by the vacuum take away device.

7. The method of claim 5 wherein the step of providing the vacuum take away device further includes the step of providing a linear velocity to the vacuum take away device which is substantially equal to a linear velocity of the web once cut.

* * * * *